United States Patent [19]

Brown

[11] Patent Number: 5,033,655
[45] Date of Patent: Jul. 23, 1991

[54] DISPENSING PACKAGE FOR FLUID PRODUCTS AND THE LIKE

[75] Inventor: Paul E. Brown, Midland, Mich.

[73] Assignee: Liquid Molding Systems Inc., Mich.

[21] Appl. No.: 343,464

[22] Filed: Apr. 25, 1989

Related U.S. Application Data

[63] Continuation-in-part of Ser. No. 311,190, Feb. 15, 1989.

[51] Int. Cl.⁵ .................. B05B 11/04; B65D 25/42; F16L 47/00
[52] U.S. Cl. .................. 222/212; 222/490; 222/494; 285/382; 285/423
[58] Field of Search ............ 222/494, 491, 490, 212; 285/382, 423; 403/274, 284

[56] References Cited

U.S. PATENT DOCUMENTS

| | | |
|---|---|---|
| 1,607,993 | 11/1926 | Loewy . |
| 1,748,682 | 2/1930 | Smith . |
| 1,825,553 | 9/1931 | Smith . |
| 1,989,145 | 1/1935 | Newby ................... 221/60 |
| 1,996,156 | 4/1935 | Janssen ................... 221/60 |
| 2,591,354 | 4/1952 | Harris ................... 222/490 |
| 2,679,954 | 6/1954 | Barnes ................... 222/490 |
| 2,688,979 | 9/1954 | Kendrick ............... 137/512.15 |
| 2,720,881 | 10/1955 | Jones ................... 128/261 |
| 2,758,755 | 8/1956 | Schafler ................... 222/213 |
| 2,802,607 | 8/1957 | Kalmbach, Jr. et al. ......... 222/490 |
| 2,937,795 | 5/1960 | Ciliberti ................... 222/490 |
| 2,941,544 | 6/1960 | Peras ................... 137/525 |
| 2,942,762 | 6/1960 | Fahr ................... 222/207 |
| 3,165,241 | 1/1965 | Curry ................... 222/490 |
| 3,179,301 | 4/1965 | Lucht ................... 222/213 |
| 3,669,323 | 6/1972 | Harker et al. ............... 222/490 |
| 3,674,183 | 7/1972 | Venable et al. ............... 222/212 |
| 3,726,436 | 4/1973 | Despain et al. ............... 222/213 |
| 3,795,558 | 3/1974 | Dabney et al. ............... 285/382 |
| 4,036,412 | 7/1977 | Craig ................... 222/490 |
| 4,109,836 | 8/1978 | Falarde ................... 222/494 |
| 4,133,457 | 1/1979 | Klassen ................... 222/212 |
| 4,269,330 | 5/1981 | Johnson ................... 222/494 |
| 4,616,768 | 10/1986 | Flier ................... 222/92 |
| 4,620,648 | 11/1986 | Schwartzman ............... 222/490 |
| 4,646,945 | 3/1987 | Steiner et al. ............... 222/207 |
| 4,728,006 | 3/1988 | Drobish et al. ............... 222/181 |
| 4,749,108 | 6/1988 | Dornsbusch et al. ............... 222/212 |
| 4,932,114 | 6/1990 | Morse et al. ............... 285/382 |

FOREIGN PATENT DOCUMENTS

| | | |
|---|---|---|
| 8814121 | 2/1989 | Fed. Rep. of Germany . |
| 673584 | 1/1930 | France . |
| 344215 | 5/1931 | United Kingdom ............... 222/490 |

OTHER PUBLICATIONS

"Silastic LSR-A Guide to Product Performance", 1985, Dow Corning Corp.

*Primary Examiner*—Andres Kashnikow
*Assistant Examiner*—Karen B. Merritt
*Attorney, Agent, or Firm*—Price, Heneveld, Cooper, DeWitt & Litton

[57] ABSTRACT

A dispensing package is provided for fluid products, such as liquids, pastes, powders and the like. The package comprises a container in which the product is packaged, and a self-sealing dispensing valve which automatically opens and closes in response to the application and removal of a predetermined threshold pressure. A removable closure may be provided to cover the dispensing valve and prevent inadvertent discharge of the product during transport, storage and other similar conditions.

2 Claims, 8 Drawing Sheets

DISPENSING PACKAGE FOR FLUID PRODUCTS AND THE LIKE

CROSS REFERENCES TO RELATED APPLICATIONS

The present application is related to and a continuation-in-part of co-pending U.S. patent application Ser. No. 07/311,190, filed Feb. 15, 1989, entitled SELF-SEALING VALVE DESIGN, which is hereby incorporated by reference.

BACKGROUND OF THE INVENTION

The present invention relates to product packaging, and in particular to a dispensing package for fluid products, and the like.

Many different types of packages or containers are presently available for storing non-solid products of the type which are capable of flowing, such as fluid or fluidized materials, including liquids, pastes, powders, and the like, which substances are collectively and generically referred to herein as "fluids." Some such packages include a dispenser which permits a selected amount of fluid to be discharged from the package, and then reseals to close the package.

Self-sealing dispensing valves have been used in packaging for certain types of products, such as the container disclosed in U.S. Pat. No. 4,728,006 to Drobish et al., which is designed for shampoos, conditioners, and the like. However, such valves can experience sealing problems, and inconsistent dispensing flow rates, particularly when the packages are exposed to significant temperature variations. For instance, in most portions of North America, the ambient temperature varies greatly throughout the year, which results in some degree of temperature changes inside even air-conditioned buildings, particularly between nighttime and daytime. For packages designed for use in special places, such as a household shower or bath, the temperature in the room can shift quite drastically during use. Dispensing packages used in such environments experience difficulty in maintaining consistent flow and sealing characteristics.

Furthermore, valves constructed from most conventional plastic materials cannot be used in certain types of packages, since they either react with or adulterate the product. For instance, in food packaging, care must be taken to avoid valve materials which contain any type of toxins. Furthermore, active ingredients in products can cause the valve to either embrittle or soften, thereby ruining the designed flow rate and/or self-sealing characteristics of the valve.

SUMMARY OF THE INVENTION

One aspect of the present invention is a dispensing package with a crimped valve retainer arrangement. The dispensing package comprises a container, with a self-sealing dispensing valve positioned on a lip of the container to communicate with a discharge opening in the container. The dispensing valve includes a retainer flange which is resiliently deformable between opposite faces. A retainer ring is associated with the container, and includes a crimpable ring which is inelastically deformed about the flange of the dispensing valve to form a rim which engages the outer face of the dispensing valve flange, and compresses the flange between the lip of the container and the rim of the retainer ring to securely mount the dispensing valve on the container, and simultaneously form a leak resistant seal therebetween.

Another aspect of the present invention is a method for mounting a self-sealing dispensing valve in a container. The method includes crimping a collar portion of the container about a flange portion of the valve, and compressing the same to form a leak resistant seal between the valve and the container.

Yet another aspect of the present invention is a dispensing package with a snap-on valve retainer arrangement. The dispensing package comprises a container having a lip disposed adjacent to the discharge opening, and a first snap-lock member. A self-sealing dispensing valve is positioned to communicate with the discharge opening of the container, and includes a retainer flange which is resiliently deformable between opposite faces. One of the dispensing valve faces is positioned on the lip of the container, and is oriented such that the orifice communicates with the discharge opening. A valve retainer is provided, and includes a rim shaped to abuttingly engage the outer face of the dispensing valve. The valve retainer includes a second snap-lock member which is shaped to mate with the first snap-lock member on the container. With the dispensing valve positioned between the container and the valve retainer, linear converging motion between the container and the valve retainer engages the first and second snap-lock members, and compresses the flange of the dispensing valve between the lip of the container and the rim of the valve retainer to securely mount the dispensing valve on the container, and simultaneously form a leak resistant seal therebetween.

Yet another aspect of the present invention is a dispensing package with a screw-on valve retainer and torque ring arrangement. The dispensing package comprises a container having a lip disposed adjacent to a discharge opening and a threaded neck. A self-sealing dispensing valve is positioned to communicate with the discharge opening of the container, and includes a retainer flange which is resiliently deformable between opposite faces. A valve retainer is provided which includes a rim shaped to abuttingly engage one of the faces of the dispensing valve, and includes a threaded portion shaped to mate with the threaded neck of the container to removably interconnect the same. A torque ring is positioned between the lip of the container, and is rotationally slidable thereon, whereby with the dispensing valve positioned between the torque ring and the valve retainer, rotation of the valve retainer with respect to the container engages the threaded portions, and compresses the flange of the dispensing valve between the lip of the container and the rim of the valve retainer to securely mount the dispensing valve on the container, and simultaneously form a leak resistant seal therebetween.

Yet another aspect of the present invention is a ribbed, self-sealing dispensing valve adapted to be positioned adjacent the discharge opening of a container. The dispensing valve includes a wall with a least one slit therethrough which defines an orifice that opens and closes in response to the application and removal of a predetermined threshold pressure. At least one rib extends longitudinally along the valve wall to a preselected distance from the slit, and is located intermediate to the opposite ends of the slit to selectively stiffen the wall of the valve to insure complete and timely closure of the orifice upon removal of the threshold pressure.

Yet another aspect of the present invention is a slit forming method for ribbed valves, wherein the valve is positioned in a slitting jig having an interior shape substantially identical to the exterior shape of the valve. At least one slot is formed through the top of the valve by inserting a slitting blade through the open end of the valve, into the valve body, and abutting against the interior surface of the valve top to compress the same against the associated portion of the slitting jig to sheer cut the valve dome along a line which extends diametrically between opposite portions of the valve body interior, and is oriented a preselected angular measure from the ribs.

Yet another aspect of the present invention is a slit and wedge self-sealing dispensing valve adapted to communicate with the discharge opening of a container. The valve includes a wall with an interior surface having at least one slit therethrough to define an orifice that opens and closes in response to the application and removal of a predetermined threshold pressure. The slit has a generally linear shape with opposite ends disposed generally in line. The valve also includes at least one wedge disposed on the interior surface of the valve adjacent to one end of the slit. The wedge is oriented generally perpendicular to the slit, and assists in the opening of the orifice in response to the application of the threshold pressure, and selectively stiffens the wall of the valve to insure complete and timely closure of the orifice upon removal of the threshold pressure.

Yet another aspect of the present invention is a conical self-sealing dispensing valve which is adapted to communicate with the discharge opening of a container. The dispensing valve includes a wall with at least one slit therethrough defining an orifice which opens and closes in response to the application and removal of a predetermined threshold pressure. The dispensing valve also has a generally frustoconical shape with a substantially conical sidewall and a substantially flat top wall in which the orifice is disposed, so as to selectively stiffen the valve to insure complete and timely closure upon the orifice upon removal of the threshold pressure.

Yet another aspect of the present invention is a pop-up self-sealing dispensing valve adapted to communicate with the discharge opening of a container. The dispensing valve includes a base, a sidewall projecting outwardly from the base, and a top wall closing one end of the sidewall, with at least one slit therethrough defining an orifice that opens and closes in response to the application and removal of a predetermined threshold pressure. The valve sidewall is elastically flexible for shifting between an extended operational position wherein the top wall is spaced apart from the base a predetermined distance to permit fluid product to be dispensed from the container, and a retracted storage position wherein the top wall is disposed generally flush with the valve base and the sidewall is doubled over to generate forces in the valve which prevent the orifice from inadvertently opening.

Yet another aspect of the present invention is a suck-back self-sealing dispensing valve adapted to communicate with the discharge opening of a container. The dispensing valve includes a top wall with at least one opening therethrough defining an orifice that opens and closes in response to the application and removal of a predetermined threshold pressure. The top wall of the valve has an interior surface with a marginal groove encircling and spaced a predetermined distance from the orifice. The groove selectively stiffens the wall of the valve to insure complete and timely closure of the orifice upon removal of the threshold pressure, yet permits air to be drawn back into the container through the fluid product, so that the container does not collapse.

Yet another aspect of the present invention is an adhesive dot closure for use in conjunction with a self-sealing dispensing valve. A substantially imperforate patch is provided with a pressure sensitive adhesive on one side which removably attaches the patch to the exterior surface of the valve overlying the discharge opening to positively retain the orifice in a closed position and thereby prevent fluid product from being inadvertently dispensed from the container.

Yet another aspect of the present invention is a shrink wrap closure arrangement for use in conjunction with self-sealing dispensing valves. The shrink wrap closure includes a substantially imperforate sleeve constructed from a heat shrink material, which is shaped to envelop the exterior surface of the valve, whereby when the sleeve is shrunk in place, the sleeve covers the dispensing aperture of the valve to positively retain the orifice closed, and thereby prevent fluid product from being inadvertently dispensed from the container.

Yet another aspect of the present invention is a snap-on cap arrangement for use in conjunction with self-sealing dispensing valves. The snap-on cap is a substantially imperforate structure shaped to cover and enclose the exterior surface of the valve, and is detachably connected with the container to form a leak resistant fluid seal therebetween.

The principal objects of the present invention are to provide a dispensing package with a self-sealing valve which securely seals upon the removal of a predetermined threshold pressure, so as to prevent the fluid product from drying out, losing flavor, or otherwise changing the product's original characteristics by virtue of exposure to ambient air. The self-sealing dispensing valve accurately controls the flow rate of product out of the container, so as to consistently dispense a predetermined amount of product at each use, throughout the life of the package. Preferably, the dispensing valve is constructed from a liquid silicone rubber, which is completely inert, and will not react with or adulterate the product. The opening and closing characteristics of the valve remain unaltered even when the package is exposed to substantial temperature fluctuations. The non-stick nature of the liquid silicone rubber valve prevents the valve from fouling, and assists in cleaning excess product from the same. The valve is efficient in use, economical to manufacture, capable of a long operating life, and particularly well adapted for the proposed uses.

These and other advantages of the invention will be further understood and appreciated by those skilled in the art by reference to the following written specification, claims and appended drawings.

BRIEF DESCRIPTION OF THE DRAWINGS

FIG. 33 is a cross-sectional view of the dispensing valve illustrated in FIG. 32, taken along the line XXXIII—XXXIII of FIG. 32.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in the referenced figures. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein, are not to be considered as limiting, unless the claims expressly state otherwise.

Figure 1:
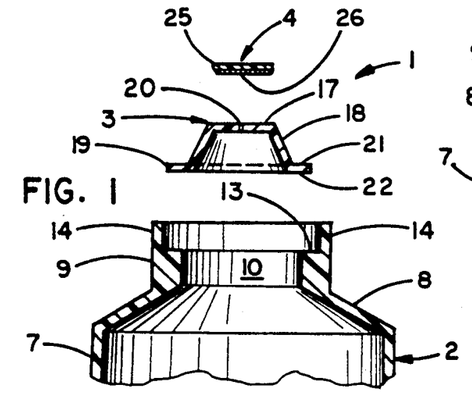
FIG. 1 is an exploded, vertical cross-sectional view of a dispensing package embodying the present invention, including a container, a self-sealing dispensing valve, and a closure.

The reference numeral 1 (FIG. 1) generally designates a dispensing package embodying the present invention. The illustrated dispensing package 1 comprises a container 2, a self-sealing dispensing valve 3, and a closure 4.

Container 2 may assume a wide variety of different shapes, sizes and constructions to accommodate various products. One particularly popular application of the present invention relates to the packaging of consumer products, such as foodstuffs, school and art supplies, toilet articles, household lubricants and other similar classes of goods. For example, fluid food items such as cooking oils, salad dressings, catsup, mustard and the like, can be advantageously packaged in the present invention. School and art supplies, such as paints, pastes, etc., as well as toilet articles, such as toothpaste, skin creams and powders, shampoos, conditioners, etc., are also popular items which can be packaged for convenience in the present invention. It is to be understood that the present invention also contemplates use with many other types of consumer products, as well as commercial, industrial and institutional applications.

In all such cases, container 2 will be shaped, sized and constructed in accordance with the particular characteristics of the product involved. In the example shown in FIGS. 1-4, container 2 has a sidewall 7 with a conically shaped top wall 8, and a cylindrically shaped neck 9. In this example, container 2 is integrally molded from a suitable plastic material, so as to form a unitary one-piece structure. The interior of neck 9 is hollow to define discharge opening 10, and the sidewall 7 is preferably elastically deformable or flexible, so that liquid material within container 2 is forced through the discharge opening 10 of neck 9 by flexing the same inwardly. The upper portion of neck 9 includes an annularly shaped recess that defines a marginal lip 13, and a crimpable collar 14 which is upstanding from lip 13.

It is to be understood that while at least some of the various containers 2 disclosed herein employ flexible sidewalls 7 to generate the "threshold pressure" (as discussed below) in the container, other means of pressure generation are also contemplated by the present invention. For example, a plunger or cylinder (not shown) may be mounted in the container 2 to pressurize the interior of the container 2. Alternatively, an outside source of fluid pressure (not shown) may be selectively communicated with the interior of the container 2. In all such cases, it is the application and removal of such pressure at the level of the designed threshold pressure of a particular dispensing package which causes the associated self-sealing valve to automatically open and close.

The self-sealing dispensing valve 3 illustrated in FIGS. 1-5 is generally frustoconical in shape, and includes a flat top wall 17, a conical sidewall 18, and an annularly shaped, radially extending flange 19. The top wall 17 of dispensing valve 3 includes a slit or aperture 20 therethrough which defines an orifice through which the product in container 2 is dispensed. The flange 19 of dispensing valve 3 is resiliently deformable between opposite faces 20 and 21 to facilitate sealingly mounting the same in the neck 9 of container 2 in the various manners described in greater detail hereinafter.

The shape and size of dispensing orifice 20 in conjunction with the thickness and configuration of the adjacent valve walls may be varied in accordance with the viscosity and other physical characteristics of the product being dispensed, as well as the desired flow rate, flow pattern, threshold pressure sealing pressure, and designed orientation of the container. The term "threshold pressure" as used herein refers to that pressure in the fluid product which will cause the dispensing orifice 20 to shift from the closed position to the open position. In the case of containers with flexible sidewalls that are deformed to create and/or exert the threshold pressure, the force necessary to achieve the same will depend upon the shape, size and rigidity of the container.

All such factors are balanced and adjusted to achieve the correct dispensing orifice 20. For example, in consumer product applications, such as toothpaste and the like, it is important to obtain the desired flow rate and pattern without requiring that excessive pressure be applied to the container 2, and without sacrificing the self-sealing closing action of the valve 3. In some applications, the containers 2 are oriented such that the dispensing valve 3 is subjected to a constant hydraulic head, such that the positive valve closure is essential to prevent leakage. In such applications the discharge orifice 20 is preferably configured such that the designed threshold pressure is greater than the maximum hydraulic head pressure of the fluid product in the container 2 when the discharge orifice 20 is oriented downwardly.

The illustrated dispensing valve 3 is integrally molded from an inert, non-toxic plastic material, so as to provide a unitary, one-piece construction. In the preferred embodiments of the present invention, dispensing valve 3 is molded from a liquid silicone rubber, such as the material marketed under the trademark "SILASTIC" by Dow Corning Corporation, the characteristics of which are disclosed in the cited brochure entitled "Silastic LSR—A Guide To Product Performance."

With liquid silicone rubber, the walls 17–19 of dispensing valve 3 are flexible, and their physical and/or chemical characteristics do not alter substantially in response to ambient changes, such as temperature fluctuations, or exposure to active ingredients in products, such as solvents, etc. Hence, the designed material flow rate and sealing pressure of any particular self-sealing dispensing valve 3 will remain relatively constant. Furthermore, since liquid silicone rubber is inert and non-toxic, dispensing valve 3 is particularly well adapted for use in conjunction with the packaging and dispensing of food products, including cooking oil, catsup, mustard, and other edible products that are sold in fluid form. As a result of the inert nature of liquid silicone rubber, dispensing valve 3 will not react with product in container 2 so as to adulterate or otherwise contaminate the product. Dispensing valves 3 constructed from liquid silicone rubber can be easily deformed without taking a set, and can be flexed repeatedly without embrittling or cracking.

Although liquid silicone rubber possesses many attributes for use in conjunction with self-sealing dispensing valves 3, it also has certain other characteristics which render such applications problematic. For example, the surfaces of liquid silicone rubber parts are extremely tacky or sticky, having a very high coefficient of friction. As a result, in attempting to attach a dispensing valve 3 to a container 2 by a conventional threaded collar arrangement, the surfaces of the valve flange 19 will stick tightly to the adjacent surfaces of the container 2 and collar before the collar is tightened securely enough to create a leak resistant seal. Further tightening of the collar will cause the valve flange 19, as well as the entire valve 3, to distort from its designed shape, thereby preventing the formation of a secure seal, and/or ruining the intended dispensing and sealing characteristics of the valve.

Another drawback associated with the use of liquid silicone rubber in dispensing valves is that there is presently no available adhesive capable of connecting the valve 3 to the container 2 in a manner that will withstand the operating pressures to which the valve 3 and container 2 are repeatedly subjected. The unique imperforate nature of the surfaces of the liquid silicone rubber valves 3 precludes the use of conventional adhesives. Hence, the attachment of the liquid silicone rubber valve 3 to the container 2 in a manner that will not leak, and will withstand repeated pressurization and depressurization of the dispensing package is an important aspect of the present invention, as discussed in detail below.

Figure 2:
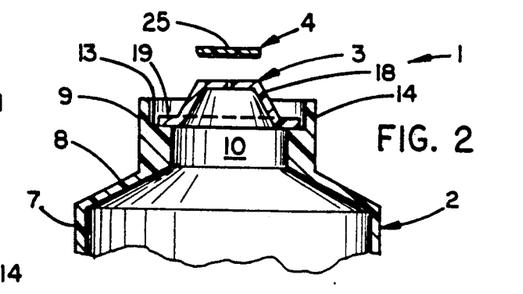
FIG. 2 is a vertical cross-sectional view of the dispensing package illustrated in FIG. 1, wherein the valve is positioned on a lip of the container, and the closure is disassembled.
Figure 3:
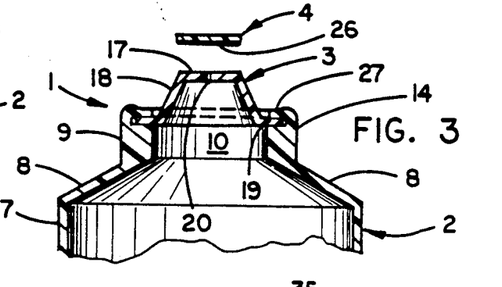
FIG. 3 is a vertical cross-sectional view of the dispensing package illustrated in FIG. 2, wherein a collar portion of the container has been crimped about a flange portion of the valve to securely mount the valve therein, and the closure is disassembled.
Figure 4:
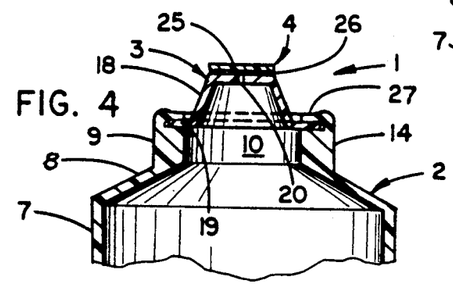
FIG. 4 is a vertical cross-sectional view of the dispensing package illustrated in FIG. 3, with the closure attached to the valve.

The closure 4 illustrated in FIGS. 1–4 comprises a substantially imperforate disc or patch 25 having a pressure sensitive adhesive 26 disposed on one side of patch 25. Patch 25 may be constructed from a variety of suitable conventional materials, such as plastic, foil back paper, or the like. Patch 25 is shaped to overlie the top wall 17 of dispensing valve 3, and completely cover orifice 20, as shown in FIG. 4.

A unique method for mounting dispensing valve 3 in closure 4 is illustrated in FIGS. 1–4, and comprises placing dispensing valve 3 on the lip 13 of container 2, as shown in FIG. 2. The collar 14 of container neck 9 is then inelastically deformed in a radially inward direction to envelop the flange 19 of dispensing valve 3, as shown in FIG. 3. That portion of collar 14 which is deformed inwardly defines a rim 27, which is forced downwardly toward container lip 13, thereby compressing the flange 19 of dispensing valve 13 between surfaces 13 and 27, and forming a leak resistant seal therebetween.

In one embodiment of the present invention, container collar 14 is constructed from a thermoplastic material. The crimping operation comprises heating the outer portion of collar 14 to a pliable state, inelastically deforming rim 27 inwardly over valve flange 19, pressing rim 27 against valve flange 19 and container lip 13 to compress valve flange 19 therebetween, and cooling rim 27 while maintaining flange compression until rim 27 returns to a state of sufficient rigidity that the compression of valve flange 19 is permanently maintained. The crimping action of rim 27 serves to securely mount dispensing valve 3 in container 2, while at the same time forming a leak resistant seal by virtue of compressing the faces 20 and 21 of valve flange 19.

Figures 8, 12, 13:
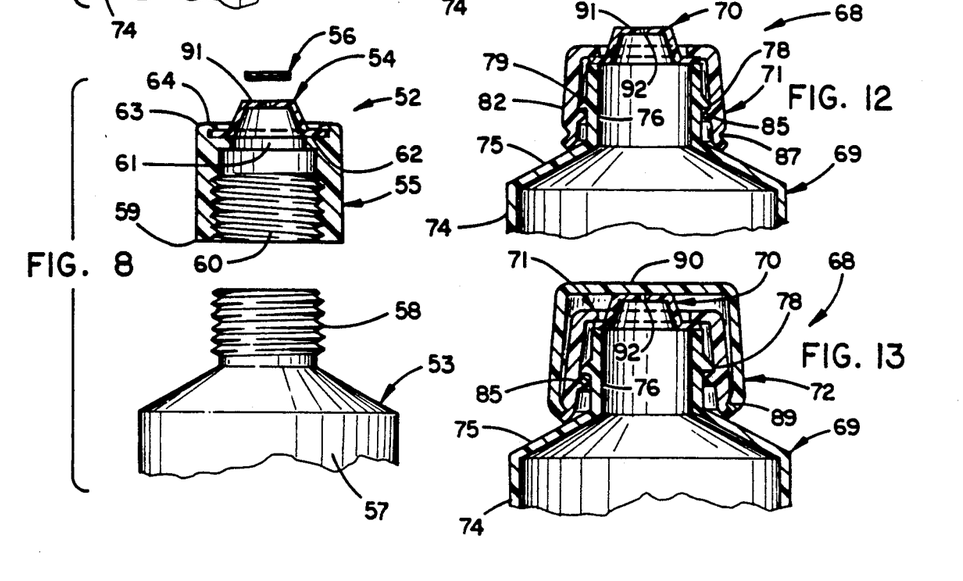
FIG. 8 is an exploded vertical cross-sectional view of another embodiment of the present invention, particularly showing a self-sealing dispensing valve crimped into a removable cap.
FIG. 12 is a vertical cross-sectional view of the dispensing package illustrated in FIG. 11, wherein the snap-on retainer ring has been snapped in place on the container, so as to compress a flange portion of the valve therebetween.
FIG. 13 is a vertical cross-sectional view of the dispensing package illustrated in FIG. 12, wherein the closure cap has been snapped in place over the valve.

It is to be understood that dispensing valve 3 may be mounted in container 2, or a removable valve retainer such as that illustrated in FIG. 8, by other types of related crimping techniques. The term "crimping" as used herein refers broadly to the generic concept of forming collar 14 over and on top of valve flange 19 to create retainer rim 27, and compressing valve flange 19 between container lip 13 and rim 27 in a fashion which permanently retains flange compression to securely mount dispensing valve 3, and simultaneously form a leak resistant seal. For instance, container collar 14 could be constructed from metal, and the rim 27 crimped over valve flange 19 by pressing, stamping, peening or other similar metal forming processes. Other materials, such as natural silicate compounds and the like, and their related forming techniques, are also contemplated by the present invention.

Figure 5:
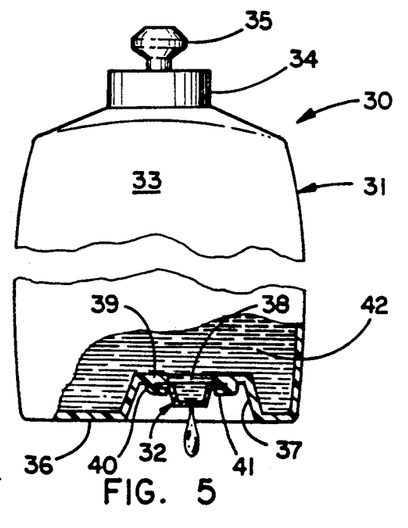
FIG. 5 is a fragmentary front elevational view of another embodiment of the present invention, particularly showing a dispensing valve mounted in a bottom portion of the container.

Another embodiment of the present invention is illustrated in FIG. 5, and defines a dispensing package 30 comprising a container 31 and a self-sealing dispensing valve 32. Except as to dispensing valve 32, container 31 has a substantially conventional construction, comprising flexible sidewalls 33, and a neck 34 with a standard, non-self-sealing dispensing valve 35. The bottom 36 of container 31 includes a unique recess 37 with a discharge opening 38 therein. The dispensing valve 32 is substantially identical to the previously described dispensing valve 3, and is mounted below discharge opening 38 by a lip 39, a collar 40, and a rim 41, which may be crimped in accordance with the method described above. Dispensing valve 32 is located on the bottom 36 of container 31, such that a preselected amount of product 42 may be dispensed from container 31 by simply positioning container 31 over the position at which dispensing is desired, and squeezing the sidewall 33 of container 31. Hence, container 31 need not be inverted each time product is to be dispensed from the package through dispensing valve 32.

Figure 6:
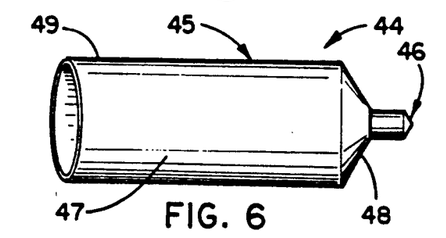
FIG. 6 is an elevational view of another embodiment of the present invention, particularly showing a tube type dispensing package with one end open to fill the tube.
Figure 7:
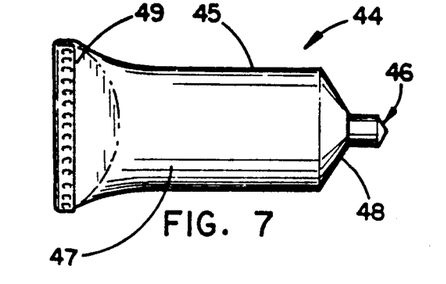
FIG. 7 is an elevational view of the dispensing package illustrated in FIG. 6, wherein the tube has been filled with fluid product through the open end, and the open end has been closed.

Another embodiment of the present invention is illustrated in FIGS. 6 and 7, and defines a dispensing package 44, comprising a tube shaped container 45, and a self-sealing dispensing valve 46. Container 45 comprises a tube shaped body having flexible sidewalls 47, and is in the nature of those conventional containers in which toothpaste and other similar products are presently packaged. Dispensing valve 46 is mounted in the frustoconical end 48 of tube 45, and is substantially identical in construction to the dispensing valve illustrated in FIGS. 35–36, and is discussed in detail below. The opposite end 48 of tube 45 is initially open, as shown in FIG. 6, so as to permit tube 45 to be filled with product through that end. After tube 45 is filled with product, end 49 is folded over and sealed in the manner illustrated in FIG. 7. Dispensing valve 46 may therefore be integrally mounted in tube 45 by means such as the above-described crimping process, before the product is packaged in tube 45.

Another embodiment of the present invention is illustrated in FIG. 8, and defines a dispensing package 52, comprising a container 53, a self-sealing dispensing valve 54, a valve retainer 55, and a closure 56. The illustrated container 53 has a conventional construction with flexible sidewalls 57, and a threaded neck 58. Valve retainer 55 comprises a generally cylindrically shaped collar 59 having interior threads 60 in the lower end thereof which mate with the threaded neck 58 of container 53. The upper end of valve retainer 55 includes a discharge opening 61, a lip 62, an upstanding collar 63 and a rim 64 which are configured generally similar to the corresponding parts 10, 13, 14 and 27 of dispensing package 1. Dispensing valve 54 is substantially identical to previously described dispensing valve 3 (FIGS. 1-4), and is crimped in place in valve retainer 55 in the manner described above. Closure 56 is substantially identical to previously described closure 4, and is attached to dispensing valve 54 in a similar manner. Dispensing package 52 permits container 53 to be filled and refilled through the neck 58 by simply removing and replacing valve retainer 55.

Another embodiment of the present invention is illustrated in FIGS. 9-13, and defines a dispensing package 68, comprising a container 69, a self-sealing dispensing valve 70, a valve retainer 71 and a closure 72. Container 69 includes a flexible sidewall 74, a conically shaped top wall 75, and a neck 76 with an uppermost, annularly shaped rim or lip 77. A snap-lock member 78 is formed on the exterior surface of container neck 76, and in the illustrated example is in the form of a frustoconical ring, having an inclined leading edge 79 and a right angled barb or edge 80.

Valve retainer 71 is in the shape of a collar, and comprises a cylindrical sidewall 82, a partial top wall 83 with an opening 84 therein, and an interior snap-lock 85 which, in the illustrated example, is in the form of a radially inwardly protruding, annularly shaped ring. The interior surface of valve retainer top wall 83 defines a rim 86 which abuts dispensing valve 70 in the manner described below. The exterior surface of valve retainer sidewall 82 includes a groove 87 to facilitate attachment of closure cap 72, as more clearly discussed hereinafter.

Figures 9, 10, 11:
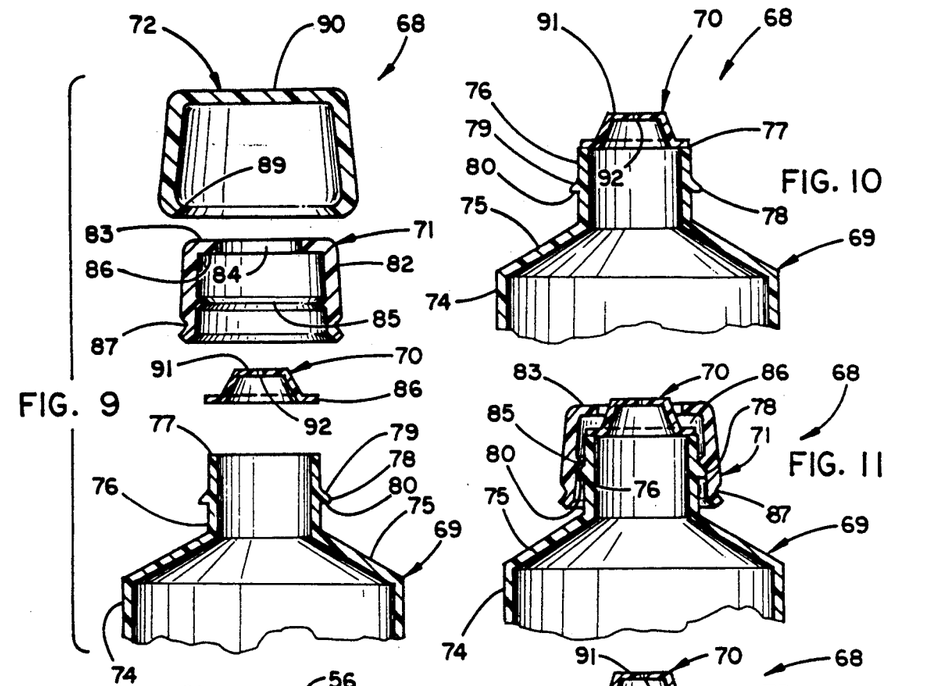
FIG. 9 is an exploded vertical cross-sectional view of another embodiment of the present invention, comprising a container, a self-sealing dispensing valve, a snap-on retainer ring, and a closure cap.
FIG. 10 is a vertical cross-sectional view of the dispensing package illustrated in FIG. 9, wherein the valve has been set in place on an upper lip portion of the container.
FIG. 11 is a vertical cross-sectional view of the dispensing package illustrated in FIG. 10, wherein the snap-on retainer ring has been positioned over the valve, but not yet snapped in place.
Figures 14, 15, 16, 17:
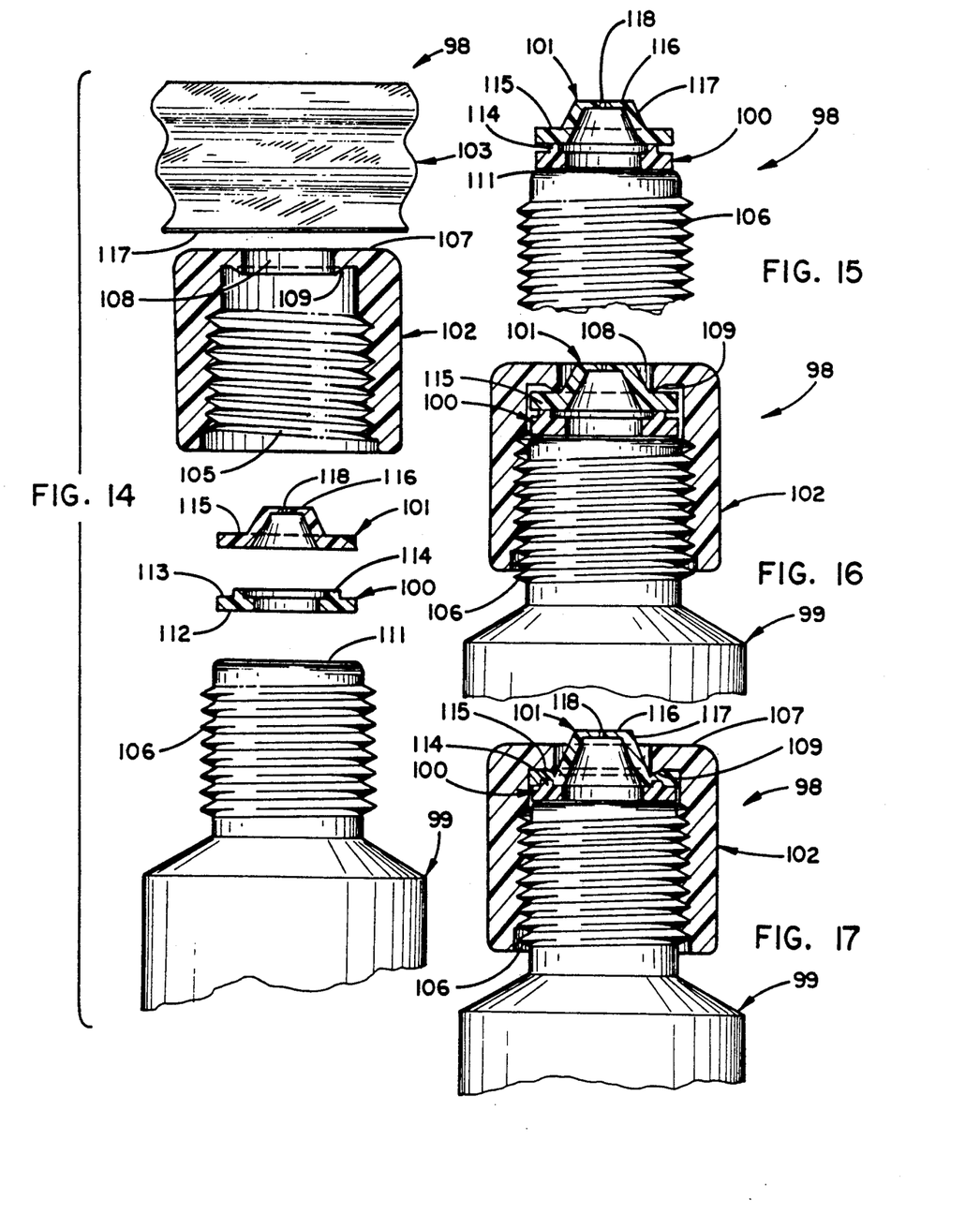
FIG. 14 is an exploded vertical cross-sectional view of another embodiment of the present invention, comprising a container, a torque ring, a self-sealing dispensing valve, a valve retainer, and a shrink wrap closure sheath.
FIG. 15 is a vertical cross-sectional view of the dispensing package illustrated in FIG. 14, wherein the valve and the torque ring are positioned on an upper lip portion of the container.
FIG. 16 is a vertical cross-sectional view of the dispensing package illustrated in FIG. 15, wherein the valve retainer has been screwed loosely onto the container, but not yet tightened.
FIG. 17 is a vertical cross-sectional view of the dispensing package illustrated in FIG. 16, wherein the valve retainer has been tightened onto the container to compress a flange portion of the valve therebetween.

Dispensing valve 70 is substantially identical to previously described dispensing valve 3 (FIGS. 1-4), and is positioned on the lip 77 of container 69 in the manner illustrated in FIG. 10. Valve retainer 71 is designed to securely attach dispensing valve 70 to container 69 without the application of torsion forces to the valve which will distort the shape of the same. Valve retainer 71 is positioned over dispensing valve 70 and the upper portion of container neck 76, in the manner illustrated in FIG. 11. Next, valve retainer 71 is converged linearly with container 69, such that the leading edge 79 of the container snap-lock ring 78 expands valve retainer 71 slightly, so that snap-ring 85 on valve retainer 71 slides over mating container snap-ring 78 and abuts stop surface 80, thereby securely interconnecting the same, without any rotational motion. Snap-rings 78 and 85 are positioned so that when they are fully engaged, as shown in FIG. 12, the flange 86 of dispensing valve 70 is compressed between the lip 77 of container 69 and the rim 87 of valve retainer 71, thereby forming a leak resistant seal therebetween. Hence, although the surfaces of the liquid silicone rubber from which dispensing valve 70 is constructed are rather sticky or tacky, the lineal or in-line snapping action between valve retainer 71 and container 69 prevents the flange 86 of valve 72 from distorting, as would occur with a conventional type of twist lock action.

Closure 72 comprises a relatively hard cap which is formed from a conventional, transparent plastic material, and includes an inwardly facing snap-ring 89 at its lower end which mates with the similarly shaped groove 87 in valve retainer 71 to interconnect the same with a snap action. The engagement between cap snap-ring 89 and valve retainer groove 87 forms a leak resistant seal. As best illustrated in FIG. 13, closure cap 72 is shaped so that when it is attached to valve retainer 71, the interior surface of the cap upper wall 90 abuts the top wall 91 of dispensing valve 70. This abutment tends to positively prevent the orifice 92 of dispensing valve 70 from opening.

Another embodiment of the present invention is illustrated in FIGS. 14-21, and defines a dispensing package 98, comprising a container 99, a torque ring 100, a self-sealing dispensing valve 101, a valve retainer 102, and a shrink wrap closure sheath 103. Container 99 is substantially identical to previously described container 53 (FIG. 8), and dispensing valve 101 is substantially identical to previously described dispensing valve 3 (FIGS. 1-4).

Figures 20, 22:
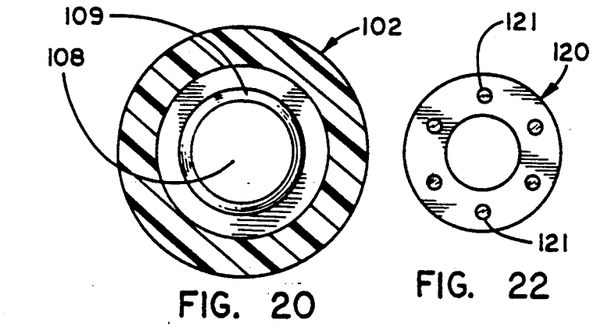
FIG. 20 is a transverse cross-sectional view of the valve retainer shown in FIGS. 14–19.
FIG. 22 is a top plan view of an alternate torque ring.
Figures 21, 23, 25:
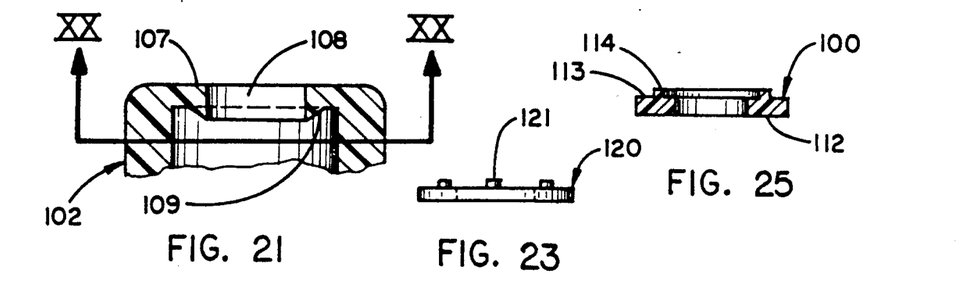
FIG. 21 is a fragmentary longitudinal cross-sectional view of the valve retainer shown in FIGS. 14–19.
FIG. 23 is a side elevational view of the torque ring illustrated in FIG. 22.
FIG. 25 is a cross-sectional view of the torque ring illustrated in FIGS. 14–19 and 24.

Valve retainer 102 has a collar shaped body, with interior threads 105 in the lower portion thereof which threadedly mate with the threaded neck 106 of container 99. The upper portion of valve retainer 102 includes a top wall 107 with an aperture 108 through which the upper portion of dispensing valve 101 protrudes, and includes a rim 109 with a downwardly extending, marginal ring 110 with an inclined or beveled exterior surface (FIGS. 20 and 21). Retainer ring 109 is positioned to abuttingly engage the dispensing valve 101 during assembly, and prevent the same from distorting.

Figure 24:
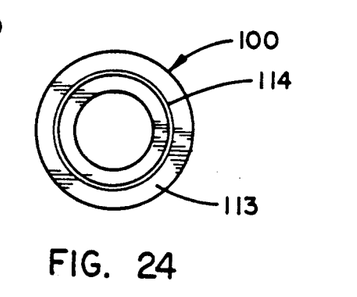
FIG. 24 is a top plan view of the torque ring illustrated in FIGS. 14–19.

Torque ring 100 is in the nature of a washer, and is adapted to rotationally slide on the lip 111 of container 99. The lower surface 112 of torque ring 100 is substantially flat, while the upper surface 113 includes an upwardly protruding ring 114 (FIGS. 24-25) which is positioned and shaped to engage the lower surface of valve flange 115 (FIGS. 14-17) and in conjunction with retainer ring 109, prevent dispensing valve 101 from distorting during assembly of valve retainer 71.

Closure 103 is in the form of a three sided sheath constructed from a shrink wrap material. The open end 117 of sheath 103 is designed to be received over and envelop valve retainer 102.

During assembly, torque ring 100 is positioned on the lip 111 of container neck 106. Dispensing valve 101 is then positioned on top of torque ring 100, aligned concentrically therewith in the manner illustrated in FIG. 15. Next, valve retainer 102 is screwed onto the threaded neck 106 of container 99 in the manner illustrated in FIGS. 16 and 17. The ring 109 of valve retainer 102 protrudes into the upper surface of valve flange 115, and ring 114 on torque ring 100 protrudes into the lower surface of valve flange 115, so as to prevent flange 115, as well as the other portions of dispensing valve 101, from distorting while valve retainer 71 is being rotationally tightened onto the threaded neck 106 of container 99. Rotational sliding motion between torque ring 100 and container lip 111 assists in maintaining the designed shape of dispensing valve 101.

Figure 18:
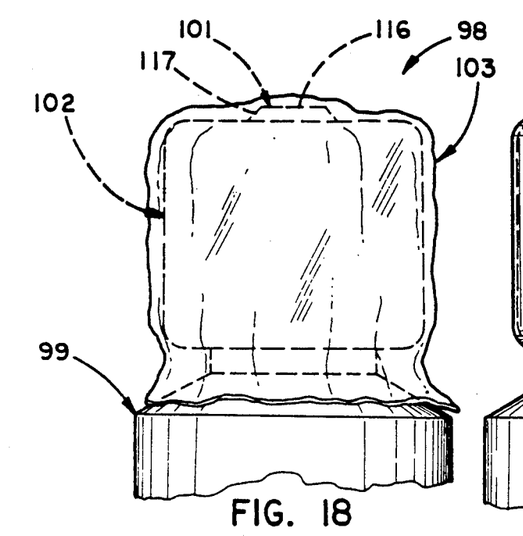
FIG. 18 is an elevational view of the dispensing package illustrated in FIG. 17, wherein the shrink wrap closure sheath has been positioned over the valve retainer.
Figure 19:
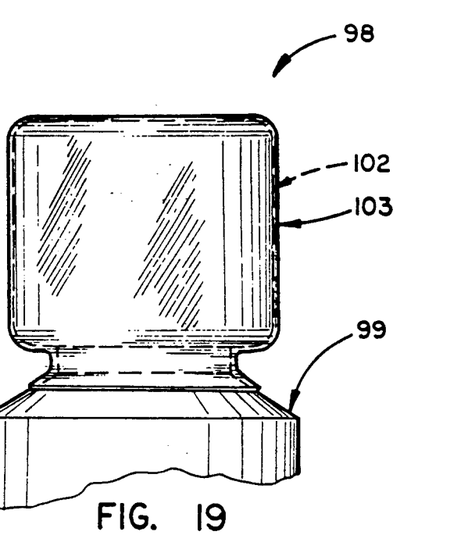
FIG. 19 is an elevational view of the dispensing package illustrated in FIG. 18, wherein the closure sheath has been shrunk around the valve retainer to cover and depress the valve into a closed position.

After valve retainer 71 is fully tightened onto container 99, shrink wrap sheath 103 is positioned over valve retainer 102, as shown in FIG. 18. Shrink wrap sheath 103 then is heated to shrink the same about valve retainer 102 in the manner illustrated in FIG. 19. This shrinking action pulls the top wall 116 of dispensing valve 101 inwardly or downwardly, and generates forces in the sidewall 117 of valve 101 which resists the opening of valve orifice 118. Hence, shrink wrap sheath 103 provides additional sealing action to prevent inadvertent discharge of product from the container 99.

An alternate torque ring 120 is illustrated in FIGS. 22-23, and is generally similar to previously described torque ring 100, except that ring 114 is replaced by a plurality of upwardly protruding, cylindrically shaped tabs 121. In the illustrated example, torque ring 120 includes six tabs 121, which are spaced equidistantly about the circumference of torque ring 120.

Another embodiment of the present invention is illustrated in FIGS. 26-31, and defines a dispensing package 130 comprising a container 131, a self-sealing dispensing valve 132, and a valve retainer 133. The illustrated container 131 is generally similar to the previously described container 53 (FIG. 8), and may also be in the form of a tube, such as the container disclosed in FIGS. 6 and 7.

Figure 28:
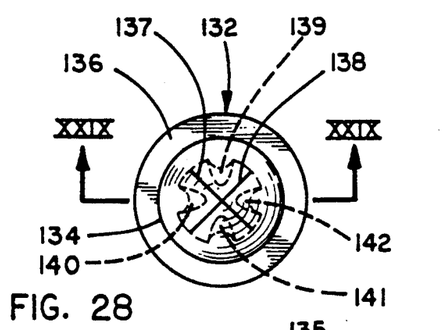
FIG. 28 is a top plan view of the dispensing valve illustrated in FIG. 27.
Figure 29:
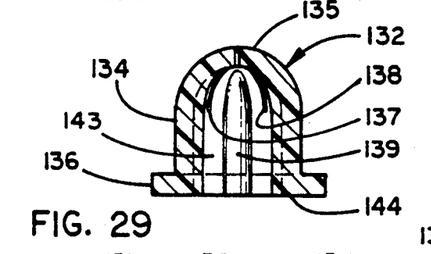
FIG. 29 is a longitudinal cross-sectional view of the dispensing valve illustrated in FIG. 28.
Figure 30:
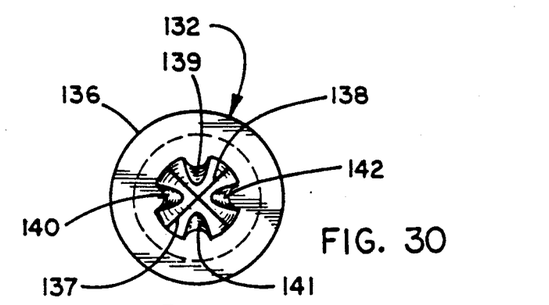
FIG. 30 is a bottom plan view of the dispensing valve illustrated in FIG. 29.

Dispensing valve 132 has a cylindrically shaped body 134 with a dome shaped top 135, and an outwardly extending flange 136 at the open end thereof. A pair of slits 137 and 138 extend through the dome shaped top 135 of dispensing valve 132, and define an orifice that opens and closes in response to the application and removal of a predetermined threshold pressure. Four ribs 139-142 (FIGS. 28-30) are positioned on the interior surface 143 of valve 132, and extend in a generally longitudinal direction therealong. Each rib 139-142 has a generally arcuate lateral cross-sectional configuration, and extends from the bottom surface 144 of flange 136 to a point adjacent to and spaced a preselected distance apart from the intersection of slits 137 and 138. Preferably, ribs 139-142 are positioned equidistantly between slits 137 and 138, such that as best illustrated in FIGS. 28 and 30, they are oriented approximately 45° apart. Slits 137 and 138 have a length substantially commensurate with the interior diameter of valve body 134 so as to maximize the opening of the orifice, and increase flow or extrusion from container 131. Ribs 139-142 serve to selectively stiffen valve 132 to insure complete and timely closure of the orifice upon removal of the threshold pressure.

Figure 31:
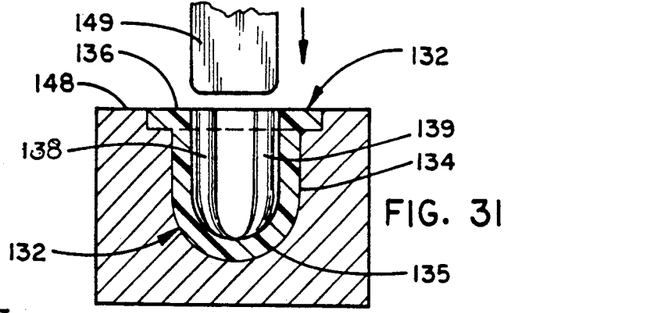
FIG. 31 is a vertical cross-sectional view of the dispensing valve illustrated in FIG. 30, shown positioned in a slitting jig, prior to the formation of a dispensing orifice.

A method for forming slits 137 and 138 is illustrated in FIG. 31, and comprises providing a slitting jig 148, which has an interior recess shaped substantially identical to the exterior shape of dispensing valve 132. With dispensing valve 132 in place in slitting jig 8, a knife or blade 149 is inserted through the open end of valve 132 into the valve body 134 abuttingly against the interior surface of the valve top 135 to compress the same against the associated portion of slitting jig 148, and shear cut the valve dome 135 along a line which extends diametrically between opposite portions of the interior surface 143 of valve body 134. Slitting blade 149 is centered between an associated pair of internal ribs 139-142, so as not to cut through any of the ribs 139-142. In this manner, the sidewall thickness of valve body 134 is minimized and the width of slits 137-138 is thereby maximized for increased flow rate. Ribs 139-142 serve to reinforce the relatively thin sidewalls of valve body 134, and insure positive closing of the orifice upon removal of the threshold pressure.

Figures 26, 27:
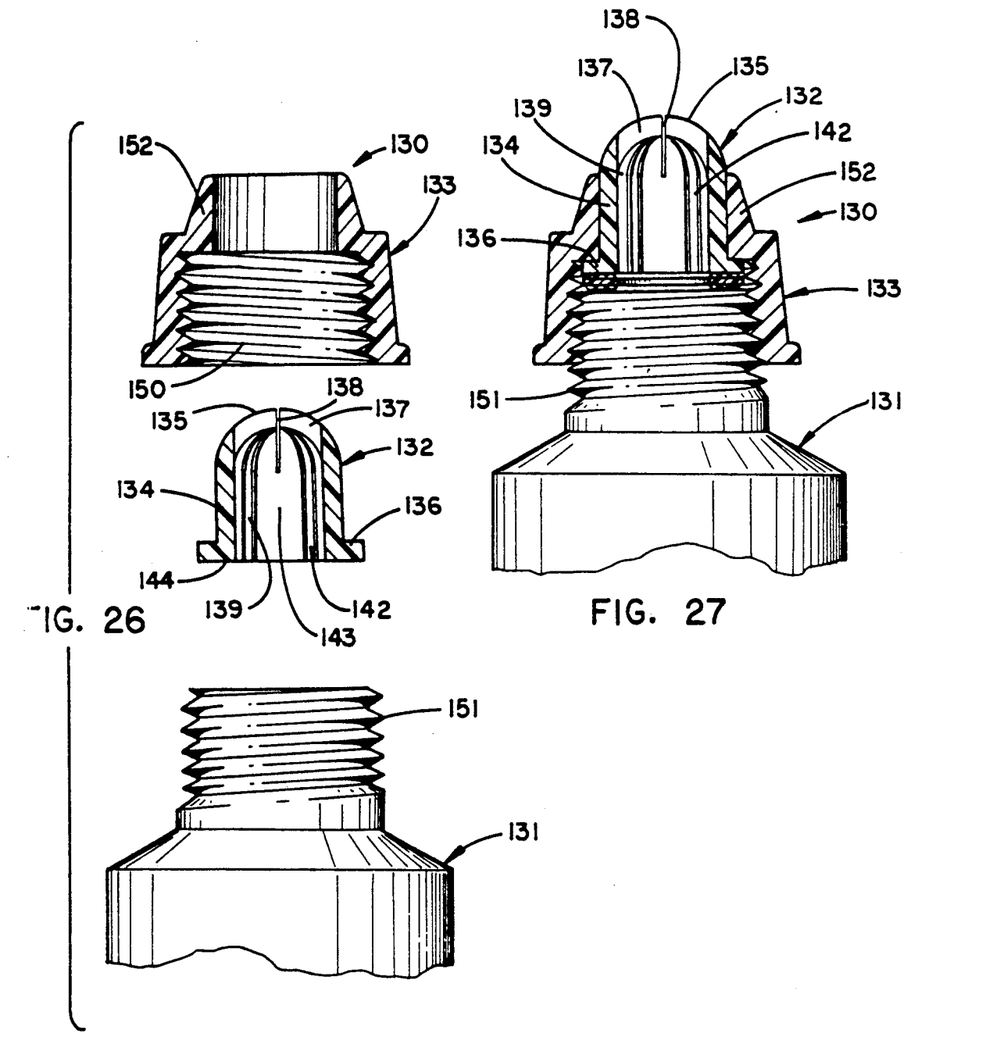
FIG. 26 is an exploded vertical cross-sectional view of another embodiment of the present invention, comprising a container, a self-sealing dispensing valve, and a valve retainer.
FIG. 27 is a vertical cross-sectional view of the dispensing package illustrated in FIG. 26, shown in a fully assembled condition.

Valve retainer 133 is collar shaped, with an interior thread 150 at one end which engages the threaded neck 151 of container 131. The opposite end of valve retainer 133 has a sleeve 152 with an interior surface shaped substantially similar to the exterior surface of valve body 134. Dispensing valve 132 is received telescopingly within valve retainer 133, and sleeve 152 extends from valve flange 136 to the bottom of valve dome 135 to selectively reinforce the body 134 of dispensing valve 132 to achieve the flow and sealing characteristics desired.

Figure 32:
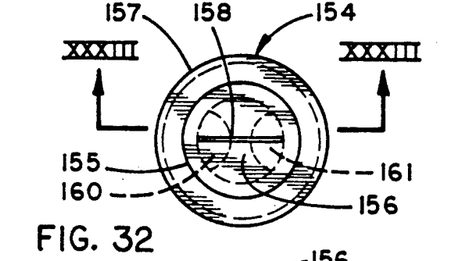
FIG. 32 is a top plan view of an alternate self-sealing dispensing valve embodying the present invention.
Figure 34:
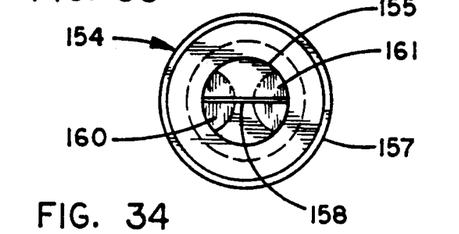
FIG. 34 is a bottom plan view of the dispensing valve illustrated in FIG. 33.

An alternate self-sealing dispensing valve 154 embodying the present invention is illustrated in FIGS. 32-33. Valve 154 has a generally top hat shaped vertical cross-sectional configuration, comprising a cylindrical sidewall 155, a flat top wall 156 and an annular flange 157. A slit 158 extends through the top wall 156 of valve 154, and has a length substantially commensurate with the interior diameter of sidewall 155 to define an orifice that opens and closes in response to the application and removal of a predetermined threshold pressure. A pair of wedges 160 and 161 are disposed on the interior surface of top wall 156 adjacent the ends of slit 158, and are oriented generally perpendicular to slit 158. Wedges 160 and 161 have a generally arcuate top plan configuration (FIGS. 32 and 34), and assist in the opening of orifice slit 158 in response to the application of the threshold pressure, and selectively stiffen the top wall 156 of valve 154 to insure complete and timely closure of the orifice slit 158 upon removal of the threshold pressure.

Figure 35:
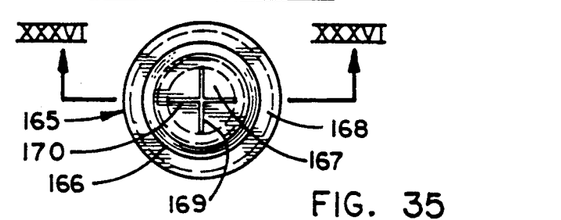
FIG. 35 is a top plan view of an alternate self-sealing dispensing valve embodying the present invention.
Figure 36:
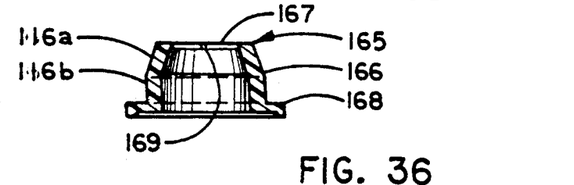
FIG. 36 is a longitudinal cross-sectional view of the dispensing valve illustrated in FIG. 35, taken along the line XXXVI—XXXVI of FIG. 35.
Figure 37:
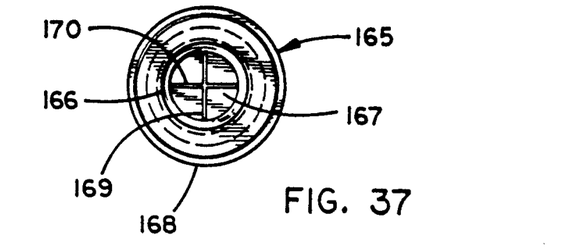
FIG. 37 is a bottom plan view of the dispensing valve illustrated in FIG. 36.

Another dispensing valve 165 embodying the present invention is illustrated in FIGS. 35-37, and comprises a sidewall 166, a top wall 167, and a flange 168. The sidewall 166 of valve 165 has a lower cylindrical portion 166a, and a frustoconically shaped upper portion 166b. The top wall 167 of valve 165 is substantially flat, and includes a pair of slits 169 and 170 which define an orifice which opens and closes in response to the application and removal of a predetermined threshold pressure. The frustoconical portion 116a of sidewall 116 selectively stiffens the valve to insure complete and timely closure of the orifice upon removal of the threshold pressure. Dispensing valve 165 is particularly adapted to dispense viscous fluids such as toothpaste, and the like.

Figures 38, 39, 40, 41:
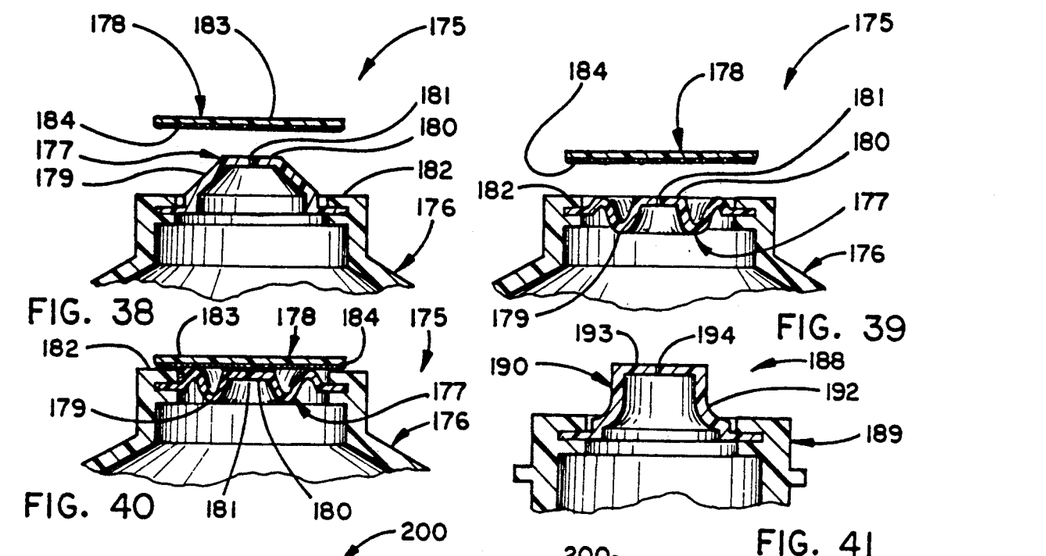
FIG. 38 is a vertical cross-sectional view of another embodiment of the present invention, comprising a container with a pop-up self-sealing dispensing valve crimped therein, shown in an extended operational position, with a closure shown in a disassembled condition.
FIG. 39 is a vertical cross-sectional view of the dispensing package illustrated in FIG. 38, wherein the dispensing valve is shown in a retracted closed position, with the closure disassembled.
FIG. 40 is a vertical cross-sectional view of the dispensing package illustrated in FIG. 39, with the closure assembled on the valve and the container to positively retain the dispensing valve in the retracted closed position.
FIG. 41 is a vertical cross-sectional view of an alternate pop-up self-sealing valve design embodying the present invention.

Another embodiment of the present invention is illustrated in FIGS. 38-40, and defines a dispensing package 175, comprising a container 176, a self-sealing dispensing valve 177, and a closure 178. Container 176 is substantially identical to previously described container 2 (FIGS. 1-4), and dispensing valve 177 is substantially identical to previously described dispensing valve 3 (FIGS. 1-4). Dispensing valve 177 may be integrally crimped into container 176 in the manner previously described. Dispensing valve 177 has a conically shaped sidewall 179, and a substantially flat top wall 180 through which a single slit 181 is disposed to define an orifice that opens and closes in response to the application and removal of a predetermined threshold pressure. The valve sidewall 179 is elastically deformable or flexible for shifting between the extended operational position illustrated in FIG. 38, and the retracted storage position illustrated in FIGS. 39 and 40. In the extended operational position (FIG. 38) the top wall 180 of valve 177 is extended, spaced outwardly apart from the rim 182 of container 176 a predetermined distance to permit slit 181 to open, and allow the fluid product to be dispensed from container 176. In the retracted storage position (FIGS. 39 and 40) the top wall 180 of valve 177 is disposed generally flush with the rim 182 of container 176, and the sidewall 179 is doubled over or folded, which generates forces in the valve which tend to prevent the orifice slit 181 from inadvertently opening.

The closure 178 illustrated in FIGS. 38–40 comprises an imperforate patch with a pressure sensitive adhesive 184 on the lower side thereof, somewhat similar to closure 4 (FIGS. 1–4), except that it is larger in diameter. Closure 178 is designed to adhere to the top wall 180 of valve 177, and also to the rim 182 of container 176, so as to positively retain valve 177 in the retracted storage position.

Figure 42:
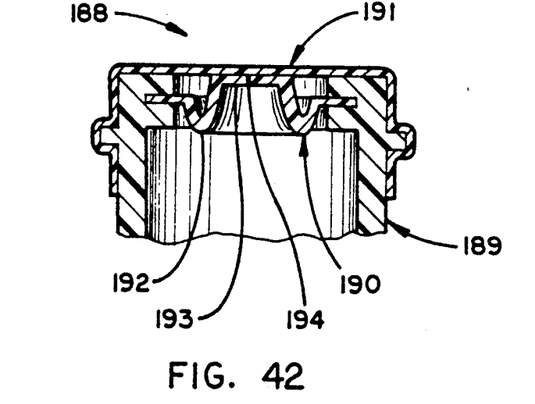
FIG. 42 is a vertical cross-sectional view of the valve illustrated in FIG. 41, shown in a retracted position and with a shrink wrap closure thereon.

Another embodiment of the present invention is illustrated in FIGS. 41–42, and defines a dispensing package 188, comprising a container 189, a self-sealing dispensing valve 190, and a closure 191. Container 189 is generally similar to previously described container 176, and retains dispensing valve 190 therein in a similarly crimped fashion. Dispensing valve 190 also has a pop-up type of construction similar to previously described dispensing valve 177 (FIGS. 38–40), except that it has an arcuately shaped sidewall 192, with a flat top wall 193 that is somewhat larger than the top wall 180 of dispensing valve 177. A single slit 194 is formed through the top wall 193 of valve 190, and defines an orifice that opens and closes in response to the application and removal of a predetermined threshold pressure. In a manner similar to dispensing valve 177 (FIGS. 38–40), dispensing valve 190 shifts between an extended operational position, as illustrated in FIG. 41, and a retracted storage position, as illustrated in FIG. 42. In the retracted storage position (FIG. 42), the folded over portions of the valve sidewall 192 generate forces which retain orifice slit 194 in the closed position.

Figures 43, 44, 45, 46:
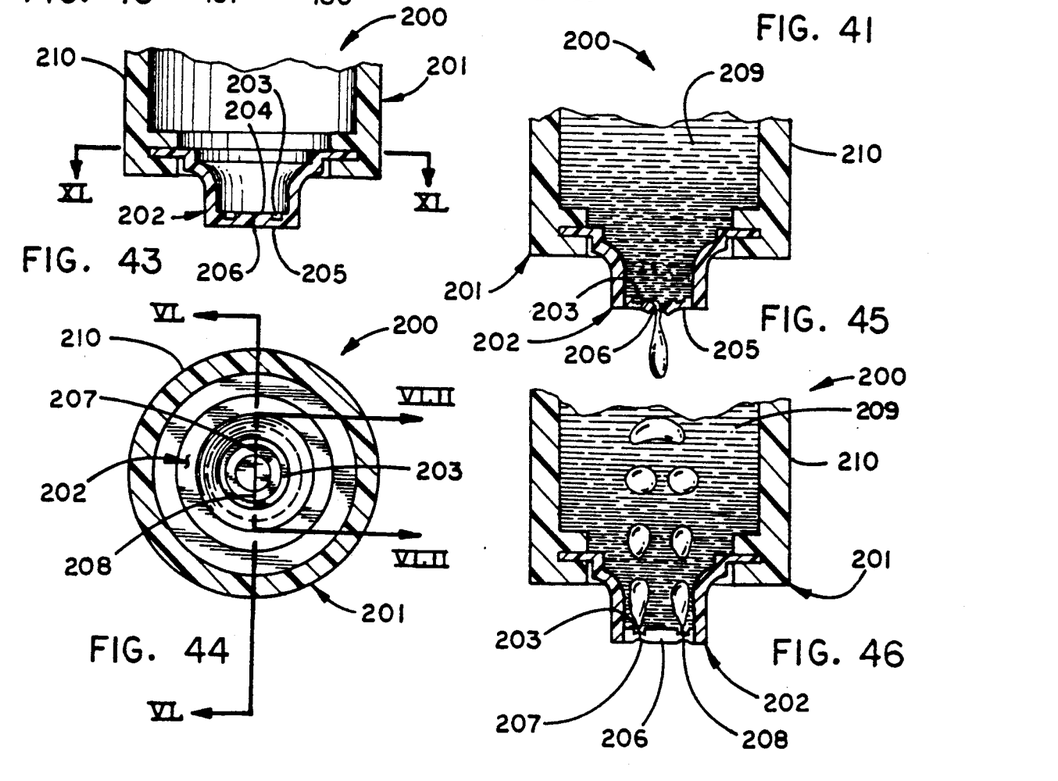
FIG. 43 is a vertical cross-sectional view of an alternate self-sealing dispensing valve embodying the present invention, which includes a suck-back ring.
FIG. 44 is a lateral cross-sectional view of the dispensing package illustrated in FIG. 43, taken along the line XXXXIV—XXXXIV of FIG. 43.
FIG. 45 is a vertical cross-sectional view of the dispensing package illustrated in FIG. 43, shown with a threshold pressure applied, and product being dispensed therefrom.
FIG. 46 is a vertical cross-sectional view of the dispensing package illustrated in FIG. 45, shown with the threshold pressure removed, and air being sucked back into the container through the suck-back ring.
Figures 47, 48:
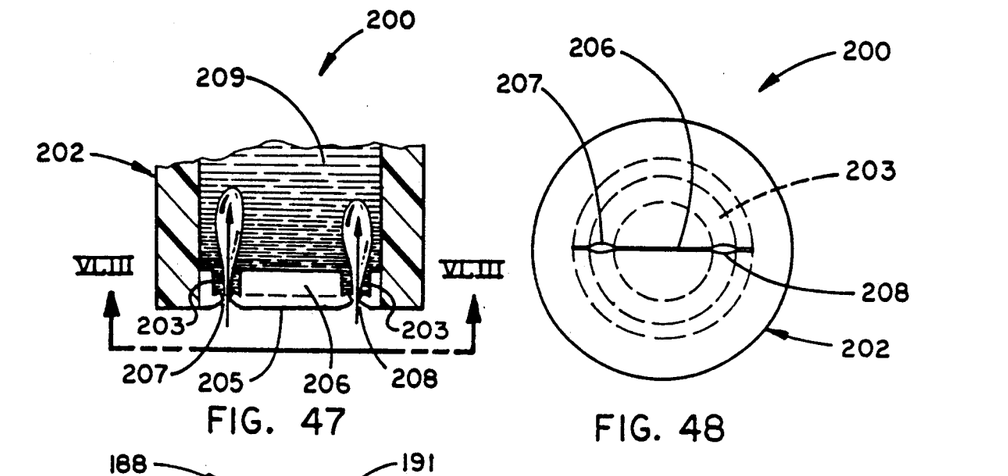
FIG. 47 is an enlarged vertical cross-sectional view of the dispensing package illustrated in FIG. 46, shown with air being drawn back into the container.
FIG. 48 is an enlarged, bottom plan view of the dispensing package illustrated in FIG. 46, shown with air being drawn back into the container.

Yet another embodiment of the present invention is illustrated in FIGS. 43–48, and defines a dispensing package 200, comprising a container 201 and a dispensing valve 202. Container 201 is substantially identical to previously described container 189 (FIGS. 41–42). Dispensing valve 202 is generally similar to previously described dispensing valve 190 (FIGS. 41–42), except that an annular marginal groove 203 is positioned in the interior surface 204 of the valve top wall 205. Groove 203 intersects the slit 206 which forms the discharge orifice at two points 207 and 208 (FIGS. 44 and 46–48). As best illustrated in FIG. 45, fluid product 209 is dispensed from container 201 by compressing or deforming sidewalls 210 in the manner described above. Dispensing valve 202 automatically closes shut upon removal of the predetermined threshold pressure. Upon removal of the threshold pressure, the thin or weakened areas 207 and 208 of valve top wall 205 permit air to be automatically sucked back into the container 201 through the liquid product, as illustrated in FIGS. 46 and 47, so that the container 201 does not collapse as the fluid product 209 is dispensed from the container 201.

The present invention also contemplates dispensing packages wherein the various containers, dispensing valves, valve retainers and closures illustrated herein may be arranged in alternative combinations, as would be apparent to those skilled in the art. For instance, closure 4 (FIGS. 1–4), illustrated in conjunction with dispensing container 1, may also be used with other dispensing valves, such as valves 154, 165, 177, 188 and 202 (FIGS. 32–48). Similarly, over cap closure 72 and heat shrink sheath 103 may be used with the other dispensing packages disclosed herein, depending upon the particular application. The various valve retainers and valve retainer methods disclosed can also be used in conjunction with the different dispensing valves, and container configurations container herein, as well as functionally similar environments.

The various dispensing packages disclosed herein are adaptable for all types of fluid products, including liquids, pastes, powders, and the like. The specific flow rate and sealing pressure desired for any particular dispensing package can be easily adjusted in accordance with the viscosity and other physical characteristics of the fluid product being dispensed. The preferred liquid silicone rubber valve provides accurate and reliable dispensing of the product, without reacting with or adulterating the product itself. The closures disclosed herein may be provided to positively prevent the dispensing valve from opening, so as to prevent the inadvertent discharge of product during transport, storage and/or other similar conditions.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows.

1. A dispensing package for fluid materials and the like, comprising:
  a container shaped to retain a preselected fluid product therein, and including a discharge opening with a marginal lip, and manually elastically deformable walls for selectively moving the fluid product in said container through said discharge opening;
  a self-sealing dispensing valve positioned to communicate with the discharge opening of said container, and including a slit center portion defining an orifice which automatically opens in response to a predetermined threshold pressure, and automatically closes upon removal of the predetermined threshold pressure; said valve central portion being constructed such that said predetermined threshold pressure is greater than the maximum hydraulic head pressure of the fluid product in said container when said discharge opening is oriented downwardly; said dispensing valve including a retainer flange disposed marginally about said orifice, and being resiliently deformable between opposite faces thereof; one of the faces of said dispensing valve flange being positioned on the lip of said container, and oriented such that said orifice communicates with said discharge opening;
  a retainer ring formed integrally in said container adjacent the discharge opening thereof, and including a crimpable collar constructed from a thermosetting plastic which is heated and inelastically deformed about the flange of said dispensing valve to form a rim which abuttingly engages the other face of said dispensing valve flange and compresses said dispensing valve flange between the lip of said container and the rim of said retainer ring to securely mount said dispensing valve on said container, and simultaneously form a leak resistance seal therebetween; and wherein said dispensing valve has a one-piece, integral construction molded from liquid silicone rubber, whereby said flange is elastically compressible, yet will not inelastically deform during heat setting of said retainer ring collar.

2. A self-sealing dispenser as set forth in claim 1, wherein:

said container includes a bottom wall with a base portion adapted to abuttingly support said container on a surface, and a recessed portion in which said discharge opening is disposed; and said dispensing valve is mounted in the recessed portion of said container bottom wall.

* * * * *